(12) United States Patent
Rekhter (10) Patent No.: US 8,310,957 B1
(45) Date of Patent: Nov. 13, 2012

(54) MINIMUM-COST SPANNING TREES OF UNICAST TUNNELS FOR MULTICAST DISTRIBUTION

(75) Inventor: Yakov Rekhter, New Rochelle, NY (US)

(73) Assignee: Juniper Networks, Inc., Sunnyvale, CA (US)

( * ) Notice: Subject to any disclaimer, the term of this patent is extended or adjusted under 35 U.S.C. 154(b) by 438 days.

(21) Appl. No.: 12/720,445

(22) Filed: Mar. 9, 2010

(51) Int. Cl.
*H04L 12/28* (2006.01)
(52) U.S. Cl. ....................................... 370/256
(58) Field of Classification Search ........... 370/254–256
See application file for complete search history.

(56) References Cited

U.S. PATENT DOCUMENTS

| | | | |
|---|---|---|---|
| 5,600,642 A | 2/1997 | Pauwels et al. |
| 6,374,303 B1 | 4/2002 | Armitage et al. |
| 6,477,166 B1 | 11/2002 | Sanzi et al. |
| 6,493,349 B1 | 12/2002 | Casey |
| 6,501,754 B1 | 12/2002 | Ohba et al. |
| 6,553,028 B1 | 4/2003 | Tang et al. |
| 6,597,703 B1 | 7/2003 | Li et al. |
| 6,731,652 B2 | 5/2004 | Ramfelt et al. |
| 6,751,218 B1 | 6/2004 | Hagirahim et al. |
| 6,778,531 B1 | 8/2004 | Kodialam et al. |
| 6,807,182 B1 | 10/2004 | Dolphin et al. |
| 6,879,594 B1 | 4/2005 | Lee et al. |
| 6,920,503 B1 | 7/2005 | Nanji et al. |
| 6,968,389 B1 | 11/2005 | Menditto et al. |
| 7,035,226 B2 | 4/2006 | Enoki et al. |
| 7,039,687 B1 | 5/2006 | Jamieson et al. |
| 7,082,102 B1 | 7/2006 | Wright |
| 7,133,928 B2 | 11/2006 | McCanne |
| 7,251,218 B2 | 7/2007 | Jorgensen |
| 7,269,135 B2 | 9/2007 | Frick et al. |
| 7,281,058 B1 | 10/2007 | Shepherd et al. |
| 7,330,468 B1 | 2/2008 | Tse-Au |
| 7,333,491 B2 | 2/2008 | Chen et al. |
| 7,359,328 B1 | 4/2008 | Allan |

(Continued)

FOREIGN PATENT DOCUMENTS

JP  2005/130258  5/2005

(Continued)

OTHER PUBLICATIONS

D. Awduche et al., "RFC 3209—RSVP-TE: Extensions to RSVP for LSP Tunnels," Network Working Group, Dec. 2001, 62 pgs. http://rfc.sunsite.dk/rfc/rfc3209hml.

(Continued)

*Primary Examiner* — Robert Wilson
*Assistant Examiner* — Kevin Lee
(74) *Attorney, Agent, or Firm* — Shumaker & Sieffert, P.A.

(57) ABSTRACT

A router determines a graph of unicast tunnels that connect a set of edge routers that will distribute multicast traffic in a network, wherein the graph comprises vertices and edges connecting one or more vertex pairs. The router calculates a minimum-cost spanning tree for the graph based on edge metric values, wherein the minimum-cost spanning tree includes the graph vertices and a selected subset of the graph edges, and wherein the minimum-cost spanning tree includes a first vertex that represents an ingress one of the set of edge routers for the multicast traffic and a second vertex that shares one of the edges with a third one of the vertices other than the first vertex representing the ingress edge router. The router then establishes an MPLS-based multicast distribution tree based on the calculated minimum-cost spanning tree to distribute the multicast traffic from the ingress router to the edge routers.

20 Claims, 6 Drawing Sheets

U.S. PATENT DOCUMENTS

| | | | |
|---|---|---|---|
| 7,360,084 B1 | 4/2008 | Hardjono |
| 7,366,894 B1 | 4/2008 | Kalimuthu et al. |
| 7,418,003 B1 | 8/2008 | Alvarez et al. |
| 7,463,591 B1 | 12/2008 | Kompella et al. |
| 7,477,642 B2 | 1/2009 | Aggarwal et al. |
| 7,483,439 B2 | 1/2009 | Shepherd et al. |
| 7,519,010 B1 | 4/2009 | Aggarwal et al. |
| 7,522,599 B1 | 4/2009 | Aggarwal et al. |
| 7,522,600 B1 | 4/2009 | Aggarwal et al. |
| 7,545,735 B1 | 6/2009 | Shabtay et al. |
| 7,558,219 B1 | 7/2009 | Aggarwal et al. |
| 7,558,263 B1 | 7/2009 | Aggarwal et al. |
| 7,564,803 B1 | 7/2009 | Minei et al. |
| 7,564,806 B1 | 7/2009 | Aggarwal et al. |
| 7,570,604 B1 | 8/2009 | Aggarwal et al. |
| 7,570,605 B1 | 8/2009 | Aggarwal et al. |
| 2002/0071390 A1 | 6/2002 | Reeves et al. |
| 2002/0109879 A1 | 8/2002 | Wing So |
| 2002/0118644 A1 | 8/2002 | Moir |
| 2002/0181477 A1 | 12/2002 | Mo et al. |
| 2002/0186664 A1 | 12/2002 | Gibson et al. |
| 2002/0191584 A1 | 12/2002 | Korus et al. |
| 2003/0012215 A1 | 1/2003 | Novaes |
| 2003/0021282 A1 | 1/2003 | Hospodor |
| 2003/0031175 A1 | 2/2003 | Hayashi et al. |
| 2003/0043772 A1 | 3/2003 | Mathis et al. |
| 2003/0056007 A1 | 3/2003 | Katsube et al. |
| 2003/0063591 A1 | 4/2003 | Leung et al. |
| 2003/0087653 A1 | 5/2003 | Leung et al. |
| 2003/0088696 A1 | 5/2003 | McCanne |
| 2003/0099235 A1 | 5/2003 | Shin et al. |
| 2003/0108047 A1 | 6/2003 | Mackiewich et al. |
| 2003/0112748 A1 | 6/2003 | Puppa et al. |
| 2003/0123446 A1 | 7/2003 | Muirhead et al. |
| 2003/0172114 A1 | 9/2003 | Leung |
| 2003/0177221 A1 | 9/2003 | Ould-Brahim et al. |
| 2003/0191937 A1 | 10/2003 | Balissat et al. |
| 2004/0037279 A1 | 2/2004 | Zelig et al. |
| 2004/0047342 A1 | 3/2004 | Gavish et al. |
| 2004/0081154 A1 | 4/2004 | Kouvelas |
| 2004/0151180 A1 | 8/2004 | Hu et al. |
| 2004/0151181 A1 | 8/2004 | Chu et al. |
| 2004/0165600 A1 | 8/2004 | Lee |
| 2004/0190517 A1 | 9/2004 | Gupta et al. |
| 2004/0218536 A1 | 11/2004 | Yasukawa et al. |
| 2004/0240445 A1 | 12/2004 | Shin et al. |
| 2004/0240446 A1 | 12/2004 | Compton |
| 2005/0001720 A1 | 1/2005 | Mason et al. |
| 2005/0018693 A1 | 1/2005 | Dull |
| 2005/0097203 A1 | 5/2005 | Unbehagen et al. |
| 2005/0108419 A1 | 5/2005 | Eubanks |
| 2005/0111351 A1 | 5/2005 | Shen |
| 2005/0169270 A1 | 8/2005 | Mutou et al. |
| 2005/0220132 A1 | 10/2005 | Oman et al. |
| 2005/0232193 A1 | 10/2005 | Jorgensen |
| 2005/0262232 A1 | 11/2005 | Cuervo et al. |
| 2005/0265308 A1 | 12/2005 | Barbir et al. |
| 2005/0271035 A1 | 12/2005 | Cohen et al. |
| 2005/0271036 A1 | 12/2005 | Cohen et al. |
| 2005/0281192 A1 | 12/2005 | Nadeau et al. |
| 2006/0013141 A1 | 1/2006 | Mutoh et al. |
| 2006/0039364 A1 | 2/2006 | Wright |
| 2006/0047851 A1 | 3/2006 | Voit et al. |
| 2006/0088031 A1 | 4/2006 | Nalawade |
| 2006/0126496 A1 | 6/2006 | Filsfils et al. |
| 2006/0147204 A1 | 7/2006 | Yasukawa et al. |
| 2006/0153067 A1 | 7/2006 | Vasseur et al. |
| 2006/0164975 A1 | 7/2006 | Filsfils et al. |
| 2006/0182034 A1 | 8/2006 | Klinker et al. |
| 2006/0221958 A1 | 10/2006 | Wijnands et al. |
| 2007/0036162 A1 | 2/2007 | Tingle et al. |
| 2007/0098003 A1 | 5/2007 | Boers et al. |
| 2007/0124454 A1 | 5/2007 | Watkinson |
| 2007/0140107 A1 | 6/2007 | Eckert et al. |
| 2008/0056258 A1 | 3/2008 | Sharma et al. |
| 2008/0123524 A1 | 5/2008 | Vasseur et al. |
| 2008/0123654 A1 | 5/2008 | Tse-Au |
| 2009/0028149 A1 | 1/2009 | Yasukawa et al. |

FOREIGN PATENT DOCUMENTS

| | | |
|---|---|---|
| JP | 2005/167482 | 6/2005 |
| JP | 2005/252385 | 9/2005 |
| KR | 2004/001206 A | 1/2004 |
| WO | 02/091670 A2 | 11/2002 |
| WO | 2004/071032 A1 | 8/2004 |

OTHER PUBLICATIONS

RSVP-TE: Resource Reservation Protocol—Traffic Extension, Javvin Company, 2 pgs, printed Apr. 18, 2005 http://www.javvin.com/protocolRSVPTE.html.

B. Zhang and H. Mouftah, "A Destination-initiated Multicast Routing Protocol for Shortest Path Tree Constructions," Globecom 2003, IEEE Global Telecommunications Conference, XP010677629, pp. 2840-2844.

Aggarwal et al., "Establishing Point to Multipoint MPLS TE LSPs," submitted to Internet Engineering Task Force (IETF) Feb. 11, 2007, pp. 1-15.

Yasukawa et al. "Requirements for Point to Multipoint extension to RSVP-TE," IETF, Oct. 2003, pp. 1-20.

Atlas et al., "MPLS RSVP-TE Interoperability for Local Protection/Fast Reroute," IETF, Jul. 2001, pp. 1-14.

Eric C. Rosen et al., "Multicast in MPLS/BGP IP VPNs," draft-rosen-vpn-mcast-07.txt, May 2004, 27 pgs.

Steven Deering et al., "Protocol Independent Multicast-Sparse Mode (PIM-SM): Motivation and Architecture," draft-ietf-idmr-pim-arch-05.txt, Aug. 4, 1998, 30 pgs.

K. Kompella et al., "Virtual Private LAN Service," draft-ietf-l2vpn-vpls-bgp-00.txt, May 2003, 22 pgs.

Y. Rekhter et al., "A Border Gateway Protocol 4 (BGP-4)," Mar. 1995, 72 pgs.

Satyanarayana et al., "Extensions to GMPLS RSVP Graceful Restart", draft-aruns-ccamp-restart-ext-01.txt, Jul. 2004, Network Working Group Internet Draft, 23 pp.

Martini et al., "Transport of Layer 2 Frames Over MPLS," Network Working Group Internet Draft, draft-martini- l2circuit-trans-mpls-08.txl, Nov. 2001, 19 pgs.

Martini et al., "Encapsulation Methods for Transport of Layer 2 Frames Over IP and MPLS Networks," Network Working Group Internet Draft, draft-martini- l2circuit-encapmpls-04.txt, Nov. 2001, 17 pgs.

Wijnands et al., "Multicast Extensions for LDP," Network Working Group Internet Draft, draft-wijnands-mpls-ldp-mcast-ext-00.txt Mar. 2005, 13 pgs.

Cormen, et al., *Introduction to Algorithms*, $2^{nd}$ edition, MIT Press and McGraw-Hill, 2001, 9 pp.

MINIMUM-COST SPANNING TREES OF UNICAST TUNNELS FOR MULTICAST DISTRIBUTION

TECHNICAL FIELD

The invention relates to computer networks and, more particularly, to multicast communications within a computer network.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

In some instances, these packets may be directed to a single destination device in a type of communication referred to as a "unicast" communication. Many applications make use of unicast communications, such as web browsers that communicate via the HyperText Transfer Protocol (HTTP). Unicast communications (or "unicasting"), however, may not be appropriate for all applications, especially those that deliver substantially the same content at substantially the same time to a plurality of destination devices, such as Internet Protocol Television (IPTV), web-conferencing, video conferencing, and other multi-user applications. For these multi-user applications, the use of unicast communications would require delivery of the same content multiple times, i.e., a separate transmission for each destination device, which would unnecessarily consume network bandwidth and strain server resources. As a result, a form of communication referred to as "multicast" communication or "multicasting" was developed to address this unnecessary consumption of network resources.

Multicasting may involve using network devices to replicate data packets for receipt by multiple recipients, thereby reducing the transmission burden on the sender and leading to potential scalability and more efficient packet delivery. A multicast source transmits multicast packets to a single address, known as the multicast group address. Recipients may request to "join" the multicast group in accordance with a protocol, such as the Internet Group Management Protocol (IGMP). If the request is granted, packets sent to the group address are replicated by the network devices of the network and forwarded to the address of the joined recipient, along with all other previously joined recipients. Because the network efficiently replicates multicast packets at these network devices, multicasting may reduce the redundant transmission that may occur when transmitting data for the above multi-user applications.

Within a service provider (SP) network, highly efficient delivery of multicast traffic for a multicast group may involve a multicast source-tree rooted at the PE router that is coupled to the customer edge (CE) router that serves the multicast source for the multicast group. This root PE router is referred to as the "ingress" router for the multicast traffic for the multicast group. Distribution techniques involving multicast source-trees in the SP network use core (P) routers to replicate and forward multicast packets, based on the multicast group address that is the packet destination address, to egress PE routers that are coupled to CE routers serving the various members of the multicast group. Consequently, highly efficient delivery may lead to forwarding state in the SP network core for a potentially unbounded number of multicast groups.

Conventional techniques to reduce forwarding state in the SP network core may rely on ingress replication. In ingress replication, the SP network uses unicast tunnels from the ingress PE router to each of the egress PE routers. Such unicast tunnels carry unicast traffic among PE routers of the SP network and may include Generic Routing Encapsulation (GRE) or IP-in-IP tunnels, as well as Multiprotocol Label Switching (MPLS)-based tunnels set up using a label distribution protocol (LDP) or Resource ReserVation Protocol with Traffic Engineering extensions (RSVP-TE). In some instances, the tunnels follow a shortest path tree rooted at the ingress PE router. The shortest path tree is a subgraph of the SP network topology in which the distance between the ingress PE router and any given egress PE router is minimized. The tunnels are established such that each tunnel has an ingress at the source from the root PE router and an egress at a respective PE router operating as a leaf node of the tree. The ingress PE router, i.e., the source PE router, encapsulates a copy of the multicast packet to form a unicast tunneled packet for each egress PE router for the multicast group and sends one of the tunneled packets to each of the egress PEs using the unicast tunnels. The receiving egress PE decapsulates the multicast packet and delivers the multicast packet to the customer network it serves. Ingress replication thus provides a "hub and spoke" solution to multicast replication to reduce the multicast-specific forwarding state in the SP network core.

SUMMARY

In general, the invention is directed to techniques for multicast replication and forwarding. For example, techniques are described for distributing aspects of replicating multicast traffic from a multicast source to non-ingress edge routers of a network while maintaining reduced multicast-specific forwarding state in a network core. That is, for a particular multicast group served by the network, additional edge routers may cooperate with an ingress edge router to replicate and distribute multicast traffic to other edge routers for the multicast group.

In one example implementation, a service provider (SP) network is a packet switched network that includes a number of provider edge (PE) routers. The PE routers have a full mesh of unicast tunnels such that each PE is able to send a packet to every other PE router by encapsulating and forwarding the multicast packet through a unicast tunnel between the respective PE router pair. For a particular multicast group served by the SP network, an ingress PE router for multicast traffic for the multicast group calculates a minimum-cost spanning tree for a complete network topology graph of selected PE routers of the SP network (e.g., the PE routers attached to CE routers having customers or subscribers that have requested to receive multicast traffic for the multicast group). The complete graph is composed of the selected PEs as vertices and of unicast tunnels connecting pairs of the selected PEs as edges.

The ingress PE router determines a multicast distribution tree based on the calculated minimum-cost spanning tree over the complete graph, which includes the selected PE routers that are specific to the multicast group. To implement the multicast distribution tree, the ingress PE adds forwarding state to forwarding information maintained by the ingress PE router and also uses signaling protocols to direct the selected PE routers to install forwarding state. In accordance with the added forwarding state, PE routers corresponding to vertices of the calculated minimum-cost spanning tree replicate and forward multicast packets to downstream PE routers.

In one embodiment, a method for establishing a multicast distribution tree in a network includes the step of constructing a graph of unicast tunnels that connect a set of edge routers that will distribute multicast traffic in the network, wherein the graph comprises a plurality of vertices and a plurality of edges connecting one or more vertex pairs, wherein each one of the plurality of vertices represents a different one of the edge routers, wherein each one of the plurality of edges that connects a vertex pair represents the unicast tunnel that connects the edge routers represented by the vertex pair, and wherein each edge has a metric value for a property of the represented unicast tunnel. The method further includes the step of calculating a minimum-cost spanning tree for the graph of unicast tunnels based on the edge metric values for the edges, wherein the minimum-cost spanning tree includes the plurality of vertices and a selected subset of the plurality of edges, wherein the minimum-cost spanning tree includes a first vertex that represents an ingress one of the set of edge routers for the multicast traffic and a second vertex that shares one of the edges with a third one of the vertices other than the first vertex representing the ingress edge router. The method includes the additional step of establishing, with a network router, the multicast distribution tree based on the calculated minimum-cost spanning tree to distribute the multicast traffic from the ingress router to the edge routers.

In another embodiment, a router includes a mesh generator to determine a graph of unicast tunnels that connect a set of edge routers that will distribute multicast traffic in a network, wherein the graph comprises a plurality of vertices and a plurality of edges connecting one or more vertex pairs, wherein each one of the plurality of vertices represents a different one of the edge routers, wherein each one of the plurality of edges that connects a vertex pair represents the unicast tunnel that connects the edge routers represented by the vertex pair, and wherein each edge has a metric value for a property of the represented unicast tunnel. The router further includes a spanning tree calculator to calculate a minimum-cost spanning tree for the graph of unicast tunnels based on the edge metric values for the edges, wherein the minimum-cost spanning tree includes the plurality of vertices and a selected subset of the plurality of edges, wherein the minimum-cost spanning tree includes a first vertex that represents an ingress one of the set of edge routers for the multicast traffic and a second vertex that shares one of the edges with a third one of the vertices other than the first vertex representing the ingress edge router. The router additionally includes a spanning tree setup module to establish a multicast distribution tree based on the calculated minimum-cost spanning tree to distribute the multicast traffic from the ingress router to the edge routers.

In another embodiment, a computer-readable medium comprises instructions. The instructions cause a programmable processor to construct a graph of unicast tunnels that connect a set of edge routers that will distribute multicast traffic in a network, wherein the graph comprises a plurality of vertices and a plurality of edges connecting one or more vertex pairs, wherein each one of the plurality of vertices represents a different one of the edge routers, wherein each one of the plurality of edges that connects a vertex pair represents the unicast tunnel that connects the edge routers represented by the vertex pair, and wherein each edge has a metric value for a property of the represented unicast tunnel. The instructions further cause the programmable processor to calculate a minimum-cost spanning tree for the graph of unicast tunnels based on the edge metric values for the edges, wherein the minimum-cost spanning tree includes the plurality of vertices and a selected subset of the plurality of edges, wherein the minimum-cost spanning tree includes a first vertex that represents an ingress one of the set of edge routers for the multicast traffic and a second vertex that shares one of the edges with a third one of the vertices other than the first vertex representing the ingress edge router. The instructions further cause the programmable processor to establish, with a network router, a multicast distribution tree based on the calculated minimum-cost spanning tree to distribute the multicast traffic from the ingress router to the edge routers.

The techniques herein described may present one or more advantages. For instance, in some network topologies, the unicast tunnels connecting the PE routers may share constituent network links. Replicating multicast packets at a node downstream from the ingress PE router may reduce, in comparison to ingress replication, the number of packet copies sent over links that are shared by two or more unicast tunnels. Unlike conventional multicast techniques, this advantage may be achieved while avoiding the need to store additional forwarding state associated with the multicast replication on intermediate nodes, such as core network routers or other, non-selected PE routers, that constitute the forwarding paths of the unicast tunnels. This feature may therefore also reduce and potentially minimize control plane overhead. In addition, distributed replication may reduce the replication burden on the ingress PE router.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
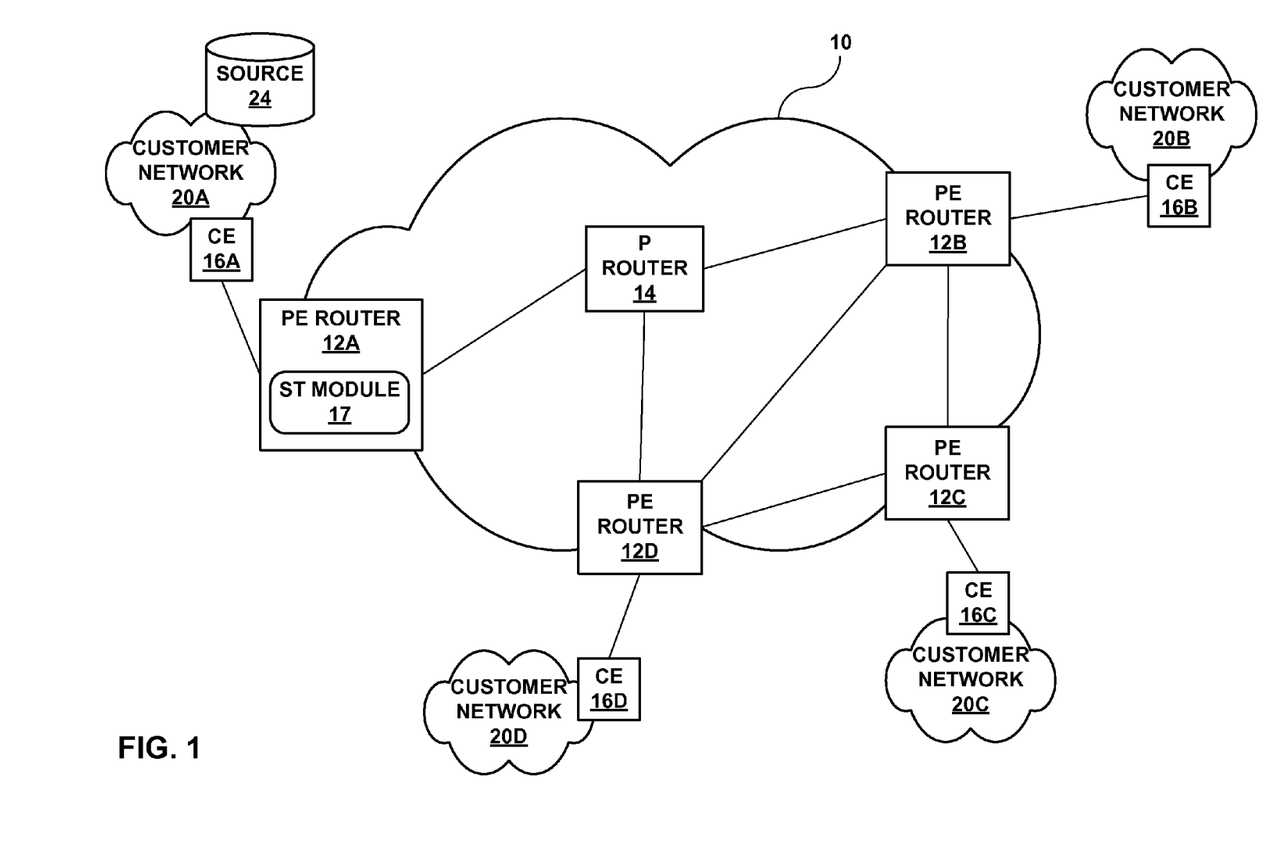
FIG. 1 is a block diagram illustrating a packet-based network that distributes multicast packets to multiple customer sites according to the techniques of this disclosure.

FIG. 1 is a block diagram illustrating an example service provider (SP) network 10 in which provider edge (PE) routers 12A-12D ("PE routers 12") exchange data over communication links and core provider (P) router 14. In the illustrated embodiment, PE routers 12 enable communication between customer networks 20A-20D ("customer networks 20"), which couple to respective ones of PE routers 12 via customer edge (CE) routers 16A-16D ("CE routers 16"). For example, PE router 12B is coupled to customer network 20B via CE router 16B.

SP network 10 is a packet-based network that may comprise, for instance, a local area network (LAN), a wide area network (WAN), the Internet, a virtual LAN (VLAN), an enterprise LAN, or some combination thereof. In various embodiments, SP network 10 is connected to a public WAN, the Internet, or to other networks. In some instances, SP network 10 may comprise a multi-protocol label switching (MPLS) network. Each of customer networks 20 may include a local area network (LAN) or a wide area network (WAN) that includes a plurality of subscriber devices, such as desktop computers, laptops, workstations, PDAs, wireless devices, network-ready appliances, file servers, print servers or other devices.

PE routers 12 are logically interconnected with unicast paths (not shown in FIG. 1) such that each one of PE routers 12 is the head of at least one path to every other one of PE routers 12. The unicast paths thus form a full mesh interconnecting PE routers 12. In some embodiments, the unicast paths may be label switched paths (LSPs).

PE router 12A routes layer three (L3) multicast traffic sourced by multicast source 24 to PE routers 12B-12D, which couple to customer networks 20B-20D and thus to one or more subscriber devices that elect to receive the multicast traffic. The L3 multicast traffic may include, for example, Internet Protocol Television (IPTV), desktop conferences, corporate broadcasts, music and video web casts, and other forms of media content.

In accordance with the techniques of this disclosure, PE router 12A includes spanning tree module 17 ("ST module 17") to calculate a minimum-cost spanning tree for a subset of PE routers 12 interconnected with the unicast paths and to establish a multicast distribution tree in SP network 10 in accordance with the minimum-cost spanning tree for multicast traffic sourced by multicast source 24 and destined for one or more of customer networks 20B-20D.

A multicast application executing on PE router 12A designates a subset of PE routers 12 as "interesting" PE routers. In some instances, an administrator or another one of PE routers 12 designates the "interesting" PE routers. The manner in which the "interesting" set of PE routers are determined may depend on the particular application in which the techniques of this disclosure are performed. For example, in the context of a virtual private LAN service (VPLS) application where SP network 10 provides VPLS, interesting PE routers 12 are those PE routers that are members of the same VPLS instance. In another example, the interesting PE routers 12 include the ingress and egress PE routers for multicast traffic for a particular multicast group or a particular multicast application. For other applications of these techniques, such as traditional IP multicast, Layer 3 multicast virtual private networks (MVPNs), and other application that use multicast, the determination of interesting PE routers 12 may be based on another criteria.

ST module 17 constructs a complete graph, i.e., a full mesh representation, of interesting PE routers 12, which are represented by vertices of the graph. To simplify explanation of the techniques of this disclosure, it is assumed that each of PE routers 12 of FIG. 1 is considered an interesting PE router in the examples discussed herein.

Each of the PE routers 12 are represented in the complete graph as vertices of the graph. The unicast paths connecting pairs of the PE routers 12 are represented in the complete graph as edges of the graph. Each of the graph edges representing a unicast path has an associated metric value for the path. The metric is a measurement of a property of the unicast paths, such as number of hops, routing distance, latency, bandwidth, load, reliability, or other routing distance metric.

ST module 17 uses a minimum-cost spanning tree algorithm to calculate a minimum-cost spanning tree for the complete graph based on the metric value associated with the edges. In general, a spanning tree of a graph comprising a plurality of vertices connected by various edges is a subgraph of the graph that (1) has no cycles, and (2) connects all of the vertices. When each edge of the graph is associated with a weight, a minimum-cost spanning tree of the graph is the spanning tree for the graph having a total cost of the edges of the spanning tree that is less than that of all other possible spanning trees. Depending on the metric, in some cases a total cost of the edges of the spanning tree may be represented by a sum of the weights of the edges. For example, if the metric values for the edges of the complete graph represent latency, the total cost is the sum of the metric values of the edges. In other examples, however, the total cost may be represented in a different manner. For example, if the metric values represent bandwidth, the total cost may be, for instance, represented by the lowest metric value of any of the edges of the spanning tree.

Each of the edges between a pair of vertices of the calculated minimum-cost spanning tree represents a unicast path from a first PE router 12 to a second PE router 12, where the vertex representing first PE router 12 is a root of a sub-tree of the calculated minimum-cost spanning tree that includes the vertex representing second PE router 12. In other words, the first PE router 12 is represented by a vertex that has a lower-order in the minimum-cost spanning tree (the root vertex having order zero) than the vertex representing the second PE router 12.

The calculated minimum-cost spanning tree serves as a basis for a multicast distribution tree for SP network 10. ST module 17 distributes multicast forwarding state to PE routers 12, e.g., by way of a signaling protocol, to assemble the multicast distribution tree using existing unicast paths interconnecting PE routers 12. According to the minimum-cost spanning tree, ingress PE router 12A, which is represented by the minimum-cost spanning tree root, replicates and forwards multicast packets received from multicast source 24 on each unicast path of SP network 10 that is represented by an edge connected to the minimum-cost spanning tree root. In addition, when any of PE routers 12 receives a multicast packet from another PE router 12 represented by a lower-order vertex of the minimum-cost spanning tree, the receiving PE router 12 replicates and forwards the multicast packet on each unicast path that is represented by an edge connected to the vertex in the minimum-cost spanning tree that represents the receiving router 12. PE routers 12 thus replicate and forward multicast traffic to "downstream" PE routers according to the multicast forwarding state that is installed in PE routers 12 by ST module 17 based on the minimum-cost spanning tree.

PE router 12A may install multicast forwarding state in the other "interesting" PE routers to establish the multicast distribution tree using a variety of signaling protocols, including Resource Reservation Protocol (RSVP), Protocol Independent Multicast (PIM), Label Distribution Protocol (LDP), or Border Gateway Protocol (BGP). In some cases, the protocol used to install forwarding state is extended to provide traffic engineering (TE) capabilities, such as RSVP with traffic-engineering extensions (RSVP-TE).

In some instances, functionality described above as provided by ST module 17 may be distributed to one or more other PE routers 12, or to another agent. For example, PE routers 12 may cooperate to execute a distributed minimum-cost spanning tree algorithm in which each of PE routers 12 computes a local minimum-cost spanning tree, then exchanges this information with the other PE routers 12 to build a network-wide minimum-cost spanning tree. As another example, a non-ingress PE router, such as PE router 12B, may initiate distribution of forwarding state and thereby establish a multicast distribution tree. In some embodiments, a network operator generates a minimum-cost spanning tree for a multicast traffic flow and distributes forwarding state to PE routers 12 in accordance with the minimum-cost spanning tree to establish a multicast distribution tree.

By establishing a multicast distribution tree based on a minimum-cost spanning tree in accordance with the techniques herein described, SP network 10 may reuse forwarding state in PE routers 12. For example, because the minimum-cost spanning tree may be composed of edges that represent existing unicast paths traversing SP network 10 (which are already represented in existing forwarding state), the multicast distribution tree leverages the existing forwarding state for PE router-PE router communication. In addition, the techniques accomplish multicast distribution without adding forwarding state to the SP network 10 core, including P router 14, in contrast to other techniques such as conventional PIM. Replicating multicast packets downstream from ingress PE 12A may reduce the number of packet copies sent over communication links that are shared by two or more PE router-PE router unicast paths, in comparison to techniques that rely exclusively on ingress replication. In addition, distributing aspects of multicast packet replication to PE routers 12B-12D may reduce the replication burden on ingress PE router 12A.

Figure 2:
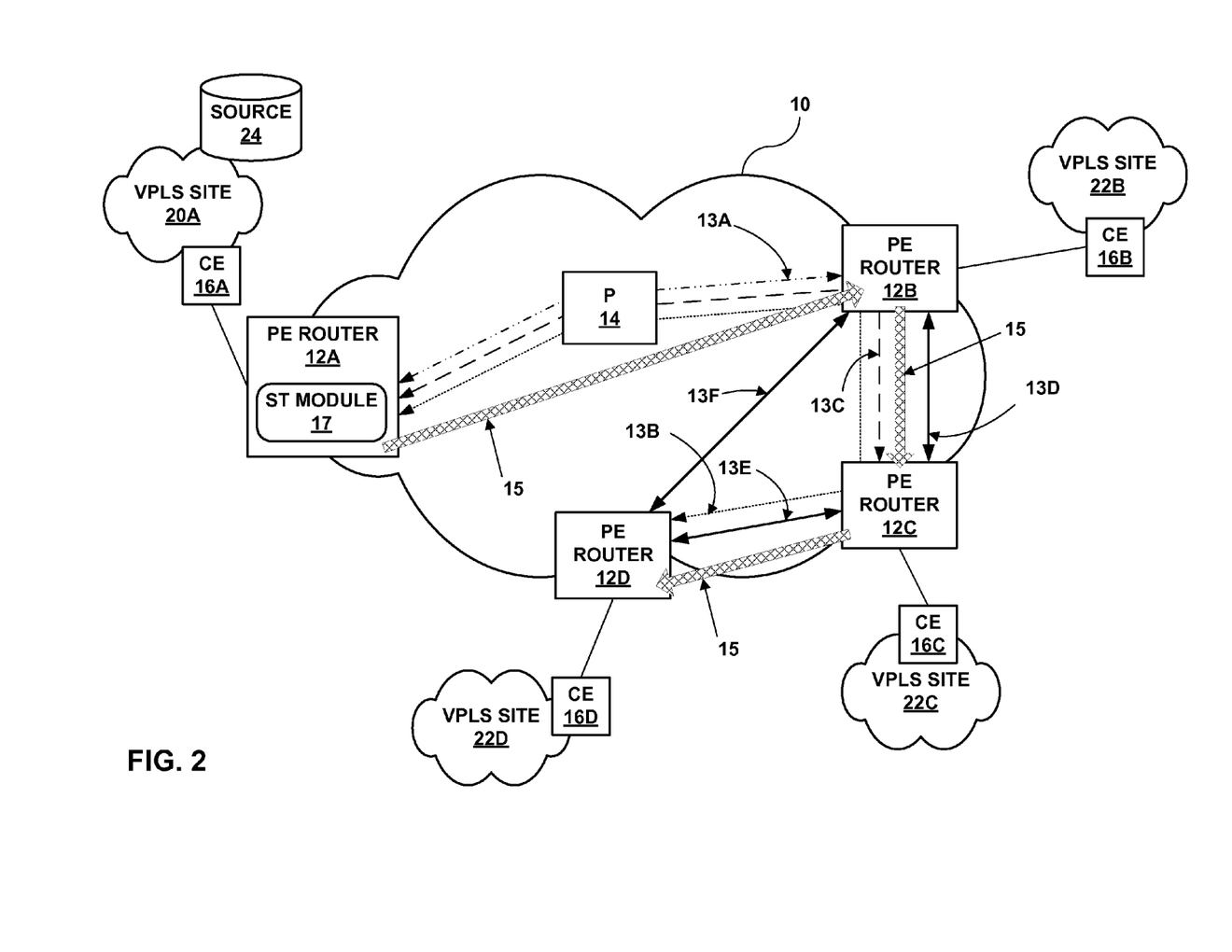
FIG. 2 is a block diagram illustrating a packet-based network that distributes multicast packets to multiple customer sites based on a minimum-cost spanning tree generated from unicast paths in accordance with the techniques of this disclosure.

FIG. 2 is a block diagram illustrating, in detail, an exemplary application of the techniques of this disclosure to the system of FIG. 1. In the illustrated embodiment, PE routers 12 enable communication between virtual private LAN service (VPLS) sites 22A-22D, which couple to respective ones of PE routers 12 via CE routers 16A-16D. SP network 10 implements a virtual private LAN service (VPLS) for VPLS sites 20. The VPLS shared by VPLS sites 20 is configured to carry L3 multicast traffic.

PE routers 12 are logically interconnected with bidirectional tunnels 13A-13F ("tunnels 13") which flow over some of the network links shown in FIG. 1 (not shown in FIG. 2 for clarity). In general, a tunnel is a communication channel between two locations that encapsulates data packets as payloads using a delivery protocol that operates at a protocol layer equal to or greater than a layer at which the payload protocol operates. As used herein, a "tunnel" also refers to a label-switched path established with, for instance, label distribution protocol (LDP) or other signaling protocol. In such instances, "encapsulation" takes the form of a label (e.g., an MPLS-based label) inserted into or otherwise applied to a data packet.

Each one of PE routers 12 terminates at least one tunnel with every other one of PE routers 12. Tunnels 13 thus form a full mesh between PE routers 12 and enable SP network 10 to transparently deliver packets from any PE router to any other PE router. Each of tunnels 13 comprises unicast paths to forward packets in each direction between the PE router pair connected by the tunnel. In the illustrated embodiment, tunnels 13 are implemented as Multiprotocol Label Switching (MPLS) Label Switch Paths (LSPs). Thus, each of tunnels 13 comprises, for example, a bidirectional LSP, or at least one unidirectional LSPs for each direction of the tunnel. In some examples, tunnels 13 may include multipoint-to-point LSPs established with LDP. In some examples, tunnels 13 may include point-to-point LSPs established with RSVP-TE.

In the illustrated embodiment, each of PE routers 12 comprises a label edge router (LER). In some embodiments, tunnels 13 are IP tunnels, such as Generic Routing Encapsulation (GRE), or another type of tunnel. In some embodiments, tunnels 13 carry pseudo-wires. Both forwarding directions for each of tunnels 13 have metric values that characterize the tunnel with respect to a particular tunnel property. For instance, in the example of FIG. 2, one metric value for tunnel 13A, the number of hops, is two.

As one example, tunnel 13C connects PE router 12A with PE router 12C. The forwarding path for tunnel 13C includes intermediate routers, specifically P router 14 and PE router 12B. The intermediate routers do not, however, maintain forwarding state for data packets encapsulated in the delivery protocol associated with tunnel 13C. That is, the data packets are opaque from the perspective of the intermediate nodes along the data path for tunnel 13C. As a result, any of PE routers 12 can leverage the forwarding states (e.g., labels) of the various intermediate nodes for tunnels 13 by sending data packets via the tunnels.

In accordance with the techniques of this disclosure, ST module 17 constructs a complete graph composed of vertices representing each of PE routers 12 and interconnecting edges representing each direction of tunnels 13. That is, each vertex pair comprises two vertices interconnected by two edges, with each edge representing one direction of the associated one of tunnels 13, and each vertex representing one of PE routers 12 that terminates the associated one of tunnels 13. The vertices of each vertex pair thus share two edges. Each edge of the complete graph has an associated metric value for the corresponding tunnel direction. In some embodiments, the complete graph has only one edge connecting the vertices. Such instances may be appropriate where, for example, tunnels 13 are unidirectional or both directions for each of tunnels 13 have the same metric value.

ST module 17 calculates a minimum-cost spanning tree for the complete graph based on the edge metric values. The minimum-cost spanning tree serves as a basis for a multicast distribution tree 15 within SP network 10 for multicast packets for which PE router 12A serves as the ingress. ST module 17 then establishes multicast distribution tree 15 having branches composed of those tunnels 13 that correspond to edges in the calculated minimum-cost spanning tree. For example, ST module 17 may push multicast forwarding state to PE routers 12 directing the PE routers to forward a received multicast packet along one or more tunnels 13, and the PE routers install the multicast forwarding state.

Each "fork" in multicast distribution tree 15 occurs at one of PE routers 12, and each PE router-PE router branch of multicast distribution tree 15 is one of tunnels 13. Specifically, in this example, multicast distribution tree 15 includes tunnels 13A, 13D, and 13E.

PE routers 12 replicate and forward multicast packets sourced from multicast source 24 along multicast distribution tree 15 as established by ST module 17 according to the described techniques. By pushing all or a portion of multicast packet replication duties to the PE routers 12 that are selected as egress PE routers, i.e., PE routers 12B-12D in this example, the techniques may reduce bandwidth wastage in the core of SP network 10 and may cause the replication burden on ingress PE router 12A to be lessened in comparison to conventional ingress replication techniques.

Furthermore, because multicast distribution tree 15 includes unicast tunnel 13A, which transparently traverses P router 14, no multicast forwarding state for the encapsulated multicast traffic is stored within the SP network 10 core (e.g., P router 14). That is, P router 14 need only maintain forwarding state for tunnel 13A, which may include forwarding state with respect to MPLS labels, unicast IP tunnels or some other tunneling state information. In some cases, the multicast forwarding state for multicast distribution tree 15 may exist solely on PE routers 12. Multicast distribution tree 15 may thus be reused for multiple multicast groups established by the VPLS shared by VPLS sites 22, so long as the interesting points for the multiple multicast groups remain identical. By contrast, in conventional IP multicast, multiple multicast groups established by the VPLS significantly burdens the SP network 10 core with potentially unbounded amounts of multicast state.

Figure 3:
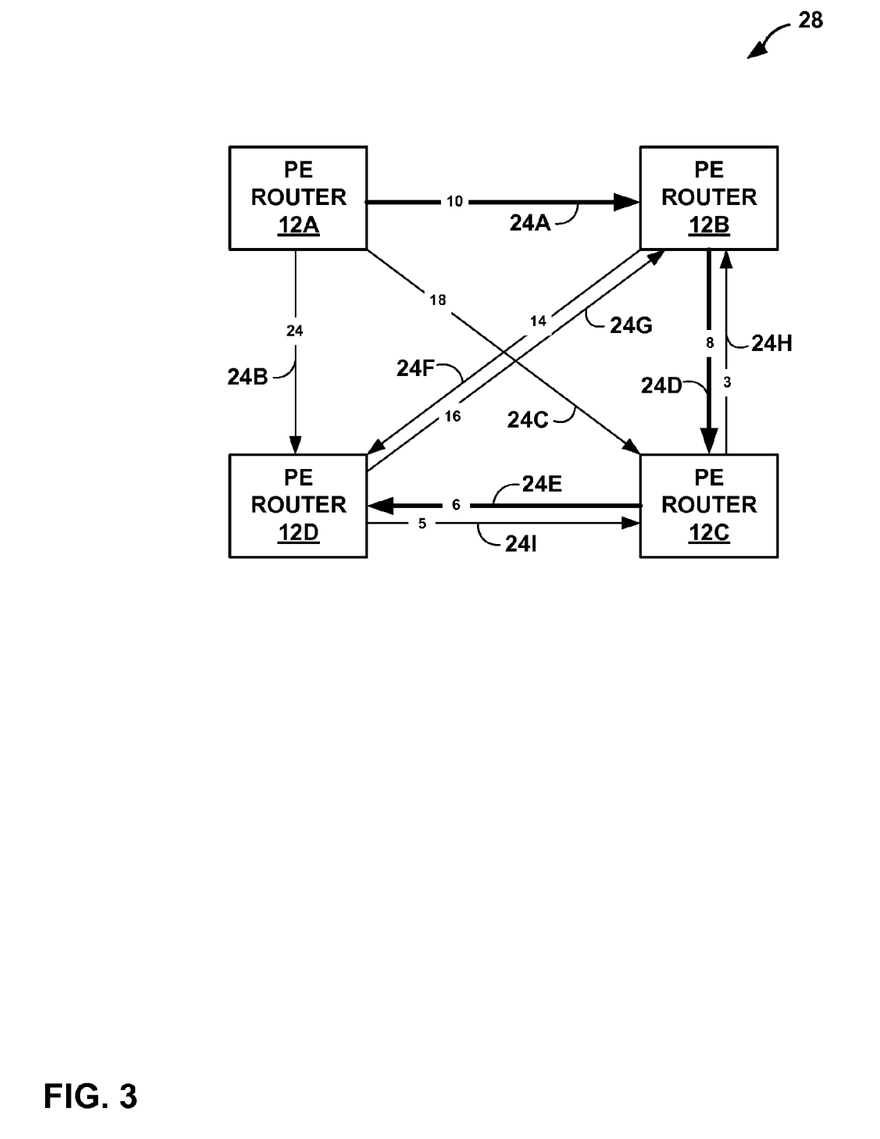
FIG. 3 is a graph, constructed in accordance with the techniques of this disclosure, which represents edge routers connected by multiple label switched paths.

FIG. 3 illustrates an exemplary graph 28, constructed in accordance with the techniques of this disclosure (e.g., by ST module 17 of PE router 12A), that represents PE routers 12 interconnected by multiple label switched paths 24A-24I ("LSPs 24"). Each of LSPs 24 is unidirectional and terminated at each end by one of PE routers 12. LSPs 24 may embody tunnels 13 of FIG. 2. For instance, unidirectional LSPs 24D and 24H may embody respective directions of bidirectional tunnel 13D connecting PE routers 12B and 12C. For ease of illustration, LSPs having ingress PE router 12A as a destination router are not shown in FIG. 3. With the inclusion of such LSPs, graph 28 would be considered a complete graph.

Graph 28 represents LSPs 24 as edges and PE routers 12 as vertices of the graph. Each of LSPs 24 has an associated metric value for the LSP, which may represent delay, load, number of hops, routing distance, or another other metric. For instance, in the example of FIG. 3, LSP 24A has a metric value of 10. ST module 17 uses a minimum-cost spanning tree algorithm to calculate a minimum-cost spanning tree for graph 28 based on the metric values for LSPs 24. ST module 17 may use, for example, Prim's algorithm or Kruskal's algorithm to calculate the minimum-cost spanning tree for graph 28. In some embodiments, ST module 17 sets ingress PE router 12A as the root for the minimum-cost spanning tree and performs a modified minimum-cost spanning tree algorithm to initially prune edges corresponding to LSPs destined for PE router 12A. Additional information regarding Prim's algorithm and Kruskal's algorithm can be found in Cormen, et al., *Introduction to Algorithms*, $2^{nd}$ edition, MIT Press and McGraw-Hill, 2001, pages 567-573, the contents of which are incorporated herein by reference.

The calculated minimum-cost spanning tree is a subset of LSPs 24 that forms a tree over graph 28 that includes each of PE routers 12 such that the sum of the metric values for the LSP subset is minimized. In some instances, more than one minimum-cost spanning tree may exist for a given graph 28. In such instances, ST module 17 may select one of the minimum-cost spanning trees.

In the example of FIG. 3, the minimum-cost spanning tree for graph 28 includes LSPs 24A, 24D, and 24E (illustrated as bolded arrows). ST module 17 communicates, using a network control protocol (e.g., RSVP-TE), with PE routers 12B-12D to establish a multicast distribution tree based on the minimum-cost spanning tree. The multicast distribution tree may reuse existing forwarding state in PE routers 12 for LSPs 24A, 24D, and 24E. For example, LSP 24D may be identified in a forwarding table maintained in PE router 12B by label L1 and interface 12.

ST module 17 uses the network control protocol to direct PE routers 12 to install multicast forwarding state to enable each PE router to distribute multicast packets, received via an inbound one of LSPs 24, along the multicast distribution tree. The multicast forwarding state for the multicast distribution tree further causes PE routers 12 to replicate and forward the multicast packets to other PE routers 12 via outbound ones of LSPs 24.

Because the multicast distribution tree is based on a spanning tree, multicast traffic sent using multicast distribution tree 29 reaches each of interesting PE routers 12B-12D. Because the spanning tree is minimum cost with respect to the metric for graph 28 edges, the multicast distribution tree makes efficient use of LSPs 24 interconnecting PE routers 12 without adding forwarding state to the SP network 10 core.

Figure 4:
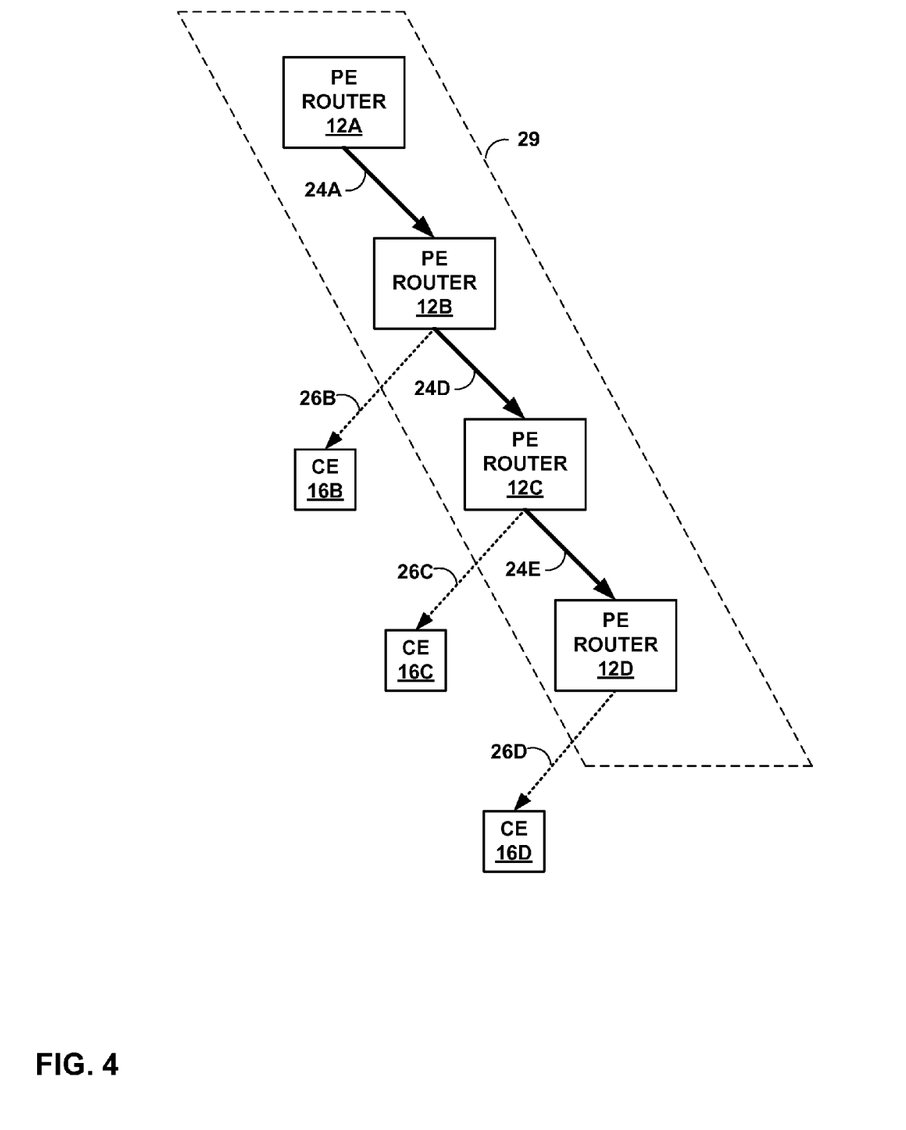
FIG. 4 is a block diagram illustrating a multicast distribution tree generated according to the described techniques.

FIG. 4 illustrates multicast distribution tree 29 established according to the techniques herein described. As one example, aspects of multicast distribution tree 29 may embody multicast distribution tree 15 of FIG. 2.

Multicast distribution tree 29 represents those PE routers 12 that service subscribers of the multicast traffic as potential vertices in the tree and LSPs 24A, 24D, and 24E as edges. PE routers 12B-12D distribute multicast traffic received with multicast distribution tree 29 to respective CE routers 16B-16D via communication links 26B-26D. PE routers 12 include multicast forwarding state to implement multicast distribution tree 29. The multicast forwarding state enables PE routers 12 to replicate and forward multicast packets along multicast distribution tree 29.

In some embodiments, the multicast forwarding state installed on PE routers 12 to implement multicast distribution tree 29 includes MPLS multicast forwarding state. MPLS multicast forwarding state may include MPLS forwarding entries in respective MPLS forwarding tables of the routers. The MPLS forwarding entries cause PE routers 12 to transport multicast packets with an MPLS label stack that includes at least an inner MPLS label and an outer MPLS label. The inner label may be a label associated with multicast distribution tree 29 for the multicast packet. The outer label may be a label associated with one of LSPs 24 is used by label switch routers along the respective LSP 24 to transport the multicast packet between PE routers 12. PE router 12B, for example, includes installed forwarding state such that when PE router 12B receives a multicast packet from another one of PE routers 12 in multicast distribution tree 29, PE router 12B pops the outer label to reveal the inner label and, based on the inner label, maps the multicast packet to the multicast distribution tree 29.

PE router 12B uses the inner label as a key to determine an MPLS forwarding entry in the MPLS forwarding table. In this example, for each downstream PE router in multicast distribution tree 29, the MPLS forwarding entry causes PE router 12B to swap the inner label for a new inner label associated with multicast distribution tree 29, push a new outer label associated with an outbound one of LSPs 24 for the downstream PE router, and send the multicast packet to the appropriate outbound interface associated with the outbound LSP 24 identified in the MPLS forwarding entry. In this instance, the MPLS forwarding entry additionally causes PE router 12B to pop the inner label, replicate the multicast packet and forward the packet to associated CE router 16B (illustrated in FIG. 2) for delivery to a subscriber.

In some instances, LSRs along LSPs 24 use penultimate hop popping (PHP). In this technique, described with respect to LSP 24A, the LSR on LSP 24A that precedes terminating PE router 12B pops the outer label associated with LSP 24A and sends the remainder of the packet to PE router 12B. In the case of multicast packets, the remainder of the packet includes an inner label. With PHP, PE router 12B need not pop an outer label for the multicast packet received via LSP 24A.

The following example describes exemplary multicast forwarding state that ST module 17 installs on PE routers 12 to implement multicast distribution tree 29. In this example, a multicast forwarding entry for ingress PE router 12A contains the following multicast forwarding state:

$$\{D_1 \rightarrow \text{push } L1; \text{ push } L2; \rightarrow IF1\}$$

As the ingress PE router 12, when PE router 12A receives a multicast packet having destination address $D_1$ (i.e., multicast group address $D_1$), the multicast forwarding entry directs PE router 12A to apply inner label L1, apply outer label L2, and then output the labeled multicast packet on interface IF1. Outer label L2 is an initial label for a first hop within LSP 24A to PE router 12B. Inner label L1 is an initial label identifies multicast distribution tree 29 for downstream PE router 12B that terminates LSP 24A.

In this example, a multicast forwarding entry for PE router 12B contains the following multicast forwarding state:

$$\left\{ \begin{array}{l} L4 \rightarrow \text{pop } L4; \\ L2 \rightarrow \text{replicate} \rightarrow \left( \begin{array}{l} \text{Copy1}: \text{swap}(L2, L3); \text{push } L5; \rightarrow IF1 \\ \text{Copy2}: \text{pop } L2; \rightarrow IF2 \end{array} \right) \end{array} \right\}$$

This multicast forwarding entry causes PE router 12B, upon receipt of a multicast packet for multicast distribution tree 29 via LSP 24A, to first pop an outer label L4 applied by a penultimate LSR of LSP 24A (e.g., P router 14). The multicast forwarding entry further causes PE router 12B, upon determining inner label L2, to create two copies of the multicast packet. For the first copy of the multicast packet, PE router 12B swaps in inner label L3 for inner label L2 on the first copy, applies outer label L5 and outputs the first copy on interface IF1. Outer label L5 is an initial label for a first hop within LSP 24D to PE router 12C. New inner label L3 identifies multicast distribution tree 29 for downstream PE router 12C that terminates LSP 24D. For the second copy of the multicast packet, PE router 12B pops inner label L2 and outputs the second copy on interface IF2 for transport to CE router 16B via communication link 26B. In this example, a multicast forwarding entry for PE router 12C is similar to the multicast forwarding entry for PE router 12B.

In this example, a multicast forwarding entry for PE router 12D contains the following multicast forwarding state:

$$\left\{ \begin{array}{l} L8 \rightarrow \text{pop } L8; \\ L9 \rightarrow \text{pop } L9; \rightarrow IF2 \end{array} \right\}$$

This multicast forwarding entry causes PE router 12DB, upon receipt of a multicast packet for multicast distribution tree 29 via LSP 24E, to first pop the outer label L8 applied by the penultimate LSR of LSP 24E. The multicast forwarding entry further causes PE router 12E, upon determining inner label L9, to pop inner label L9 and output the multicast packet on interface IF2 for transport to CE router 16D via communication link 26D.

In some instances, multicast packets transported by PE routers 12 may include only a single MPLS label to enable forwarding along one of LSPs 24. In such instances, multicast forwarding state of PE routers 12 may identify multicast distribution tree 29 for a multicast packet by the destination address (i.e., the multicast group address) of the multicast packet, rather than by an inner label.

PE routers 12 use the multicast forwarding state to tunnel a multicast packet through multicast distribution tree 29 until every PE router 12 represented by a vertex of multicast distribution tree 29 receives a copy of the multicast packet. The CE routers 16 receive copies of the multicast packet and provide the received multicast packet to the appropriate multicast receiver for the multicast group associated with multicast distribution tree 29. As a result, the techniques herein described distribute a burden of replicating multicast traffic to non-ingress edge routers of a network (in this example, PE routers 12B-12D) while maintaining reduced multicast-specific forwarding state in a network core.

Figure 5:
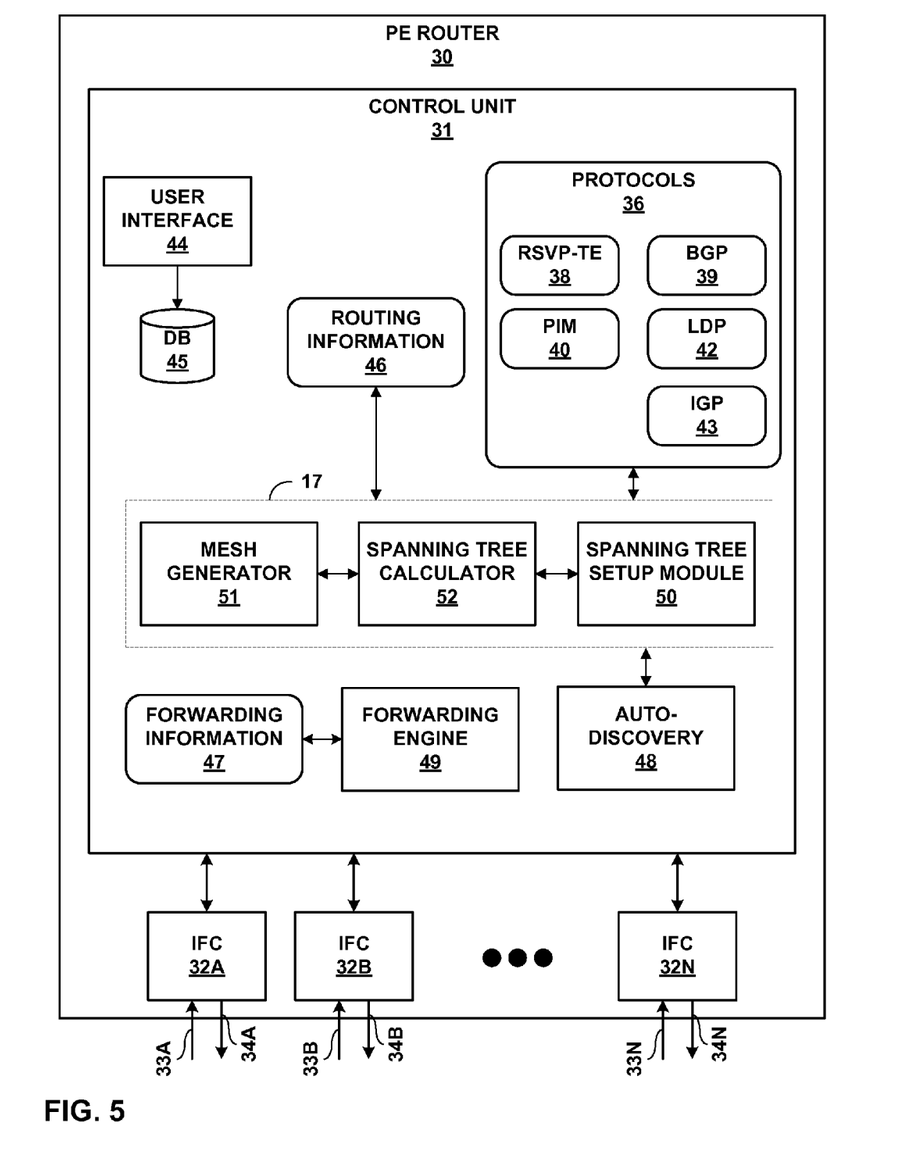
FIG. 5 is a block diagram illustrating an edge router that generates a multicast distribution tree according to the described techniques.

FIG. 5 is a block diagram illustrating exemplary PE router 30 capable of establishing, according to the techniques of this disclosure, a multicast distribution tree based on a calculated minimum-cost spanning tree for a plurality of network routers interconnected with unicast tunnels in a full mesh. PE router 30 may comprise an ingress router for multicast traffic to a network. PE router 30 may also comprise an egress router or other router identified as an "interesting" router for a given multicast application facilitated by the network. PE router 30 may operate substantially similarly to any of PE routers 12 of FIG. 1.

PE router 30 includes interface cards 32A-32N ("IFCs 32") that receive packets, including multicast packets, via inbound links 33A-33N ("inbound links 33") and send packets, including multicast packets, via outbound links 34A-34N ("outbound links 34"). IFCs 32 are typically coupled to inbound links 33 and outbound links 34 via a number of interface ports (not shown). PE router 30 also includes a control unit 31 that determines routes of received packets and forwards the packets accordingly via IFCs 32.

A system administrator may specify configuration information for PE router 30 via a user interface 44 included within control unit 31. The configuration information may then be stored in database (DB) 45 coupled to user interface 44. User interface 44 may include a display, a keyboard, a mouse or another type of input device.

Control unit 31 maintains routing information 46. Routing information 46 describes the topology of a network and, in particular, routes through the network. Routing information 46 may include, for example, route data that describes various routes within the network, and corresponding next hop data indicating appropriate neighboring devices within the network for each of the routes. Route data may include a metric value for a metric used to characterize a communication link. A metric value may combine values for multiple different metrics according to a preset formula. PE router 30 uses protocols 36 to update routing information 46 to accurately reflect the topology of the network. In some embodiments, routing information 46 comprises an MPLS routing table. In some examples, routing information 46 includes a link-state database (LSDB).

Control unit 31 also maintains forwarding information 47 that associates network destinations with specific next hops and corresponding interface ports. In general, when router 30 receives a multicast packet via one of inbound links 33, control unit 31 determines a destination and associated next hop for the packet in accordance with routing information 46 and forwarding engine 49 forwards the packet on one of outbound links 34 to the corresponding next hop in accordance with forwarding information 47 based on the destination of the packet.

Forwarding information 47 includes multicast forwarding entries for multicast source-multicast group pairs that specify tunnel interfaces for a multicast distribution tree for a multicast group. In some embodiments, multicast forwarding entries include MPLS path information to enable PE router 30 to attach the appropriate label for the LSP to an intended destination. In some embodiments, forwarding information 47 comprises an MPLS forwarding table that includes MPLS multicast forwarding entries. Routing information 46 and forwarding information 47 may include multicast forwarding state installed in accordance with the techniques of this disclosure.

Control unit 31 provides an operating environment in which protocols 36 execute. In the illustrated embodiment, protocols 36 include RSVP-TE 38, BGP 39, PIM 40, LDP 42, and IGP 43. Control unit 31 also includes auto-discovery module 48, mesh generator 51, spanning tree setup module 50, spanning tree calculation module 52. In the example of FIG. 5, spanning tree setup module 50, mesh generator 51, and spanning tree calculation module 52 are shown as exemplary functional components of ST module 17. ST module 17 may correspond to ST module 17 of FIG. 1.

Auto-discovery module 48 determines interesting PE routers and advertises properties of PE router 30 to other PE routers in the network. For example, in the context of a multicast VPN application, auto-discovery module 48 advertises MVPN memberships of PE router 30 to other PE routers in the network using BGP 39 and receives BGP advertisements from the other PE routers advertising the MVPN memberships of the other PE routers. In this manner, PE router 30 discovers a complete view of the MVPN memberships of the other PE routers in the network. Auto-discovery module 48 then, for a particular MVPN, determines which PE routers in the network also belong to the MVPN and are therefore "interesting." As another example, in the context of VPLS, auto-discovery module 48 may use BGP 39 to determine all other PE routers in the network that are involved in a given VPLS instance. As yet a further example, auto-discovery module 48 may use PIM 40 as a discovery mechanism. In some instances, an administrator manually configures PE router 30 with interesting PE routers for a particular application in configuration database 45 via user interface 44. In such instances, auto-discovery module 48 may obtain the interesting PE routers from configuration database 45.

Auto-discovery module 48 may send a list of interesting PE routers to mesh generator 51, which queries routing information 46 and/or forwarding information 47 to obtain metrics for unicast paths interconnecting the interesting PE routers. After obtaining path metrics, mesh generator 51 constructs a complete graph composed of vertices that represent the interesting PE routers and edges that represent unicast paths interconnecting the interesting PE routers. Each edge in the complete graph is weighted according to the associated path metric. In some embodiments, mesh generator 51 constructs a graph that is not a complete graph. For example, for multicast traffic associated with a particular multicast group, mesh generator 51 may disregard edges for unicast paths that have the ingress PE router for the multicast traffic as a destination. As a further example, for a particular multicast application, the interesting PE routers may not be interconnected by unicast paths in a full mesh. In this instance, mesh generator 51 constructs a graph composed only of existing unicast paths.

Mesh generator 51 may send a data structure representing the complete graph to spanning tree calculator 52 (hereinafter, "ST calculator 52"). ST calculator 52 uses a minimum-cost spanning tree algorithm to calculate a minimum-cost spanning tree for the complete graph. ST calculator 52 may send a data structure representing the calculated minimum-cost spanning tree for the complete graph to spanning tree setup module 50 (hereinafter, "ST setup module 50").

ST setup module 50 may use RSVP-TE 38 or another signaling protocol to establish a multicast distribution tree (MDT) based on the calculated minimum-cost spanning tree. For example, ST setup module 50 may use RSVP-TE 38 to install forwarding state for the MDT in the forwarding information maintained by each of the PE routers represented in the calculated minimum-cost spanning tree. The forwarding state may specify pre-established unicast paths (in this example, LSPs) that correspond to the edges of the calculated minimum-cost spanning tree. ST setup module 50 may install forwarding state for the MDT in routing information 46 and/or forwarding information 47 of PE router 30. In some embodiments, if the needed unicast tunnels are not already established in the network, RSVP-TE 38 or another protocol may be used to establish the unicast tunnels to be used for the multicast distribution tree.

As one example, for a set of interesting PE routers interconnected with a full mesh of label-switched paths (LSPs), ST setup module 50 uses RSVP-TE Path and Resv messages to set up a Point-to-Multipoint (P2MP) LSP composed of sub-LSPs that are the LSPs interconnecting the interesting PE routers. With respect to PE routers 12 and multicast distribution tree 29 of FIG. 4, for instance, ingress PE router 12A is connected to PE router 12B via LSP 24A, while PE router 12B is connected to PE router 12C via LSP 24D. In this example, PE router 30 corresponds to PE router 12A. ST setup module 50 sends an RSVP-TE Path message from ingress PE router 12A to PE router 12B. The RSVP-TE Path message includes a session object that identifies a P2MP LSP and an Explicit Route Object (ERO) that determines a path to be followed by a branch of the P2MP LSP. As a result, the P2MP LSP corresponds to multicast distribution tree 29 based on the minimum-cost spanning tree calculated by ST calculator 52. In this instance, the ERO object may specify {PE router 12A, PE router 12B, PE router 12C, PE router 12D}.

PE router 12B forwards the RSVP-TE Path message to PE router 12C and returns, to PE router 12A, an RSVP-TE Resv message containing an MPLS label for the P2MP LSP. PE router 12A installs forwarding information that directs PE router 12A to use the label for the P2MP LSP for forwarding multicast traffic associated with the P2MP LSP and, therefore, multicast distribution tree 29. In one example, PE router 12A applies the label for the P2MP LSP as an inner label to multicast traffic and applies a label for LSP 24D as an outer label for the multicast traffic.

PE router 12C forwards the RSVP-TE Path message to PE router 12D and returns, to PE router 12B, an RSVP-TE Resv message containing an MPLS label for the P2MP LSP. PE router 12B installs forwarding information that directs PE router 12B to use the label for the P2MP LSP for forwarding multicast traffic associated with the P2MP LSP. For example, the forwarding information may direct PE router 12B to, when receiving multicast traffic having the label for the P2MP LSP sent by PE router 12B to PE router 12A, swap that label with the label for the P2MP LSP received from PE router 12C, apply a label for LSP 24D, and then output the labeled multicast traffic on an interface associated with the P2MP LSP. In some instances, the installed forwarding information may also direct PE router 12B to forward the multicast traffic to CE router 12B.

PE router 12D returns, to PE router 12C, an RSVP-TE Resv message containing an MPLS label for LSP 24E. PE router 12C installs forwarding information that directs PE router 12C to use the LSP 24E label for multicast traffic associated with the P2MP LSP.

Independent of their use in a P2MP LSP for a multicast distribution tree, LSPs 24 may also be used for forwarding other network traffic, such as unicast traffic. In this manner, PE routers may reuse existing LSPs to replicate and forward multicast traffic while minimizing forwarding state in a SP network core.

In this example, the session object in RSVP-TE Resv messages identifies the P2MP LSP corresponding to multicast distribution tree 29. In more complex instances of multicast distribution tree 29, a PE router that has multiple downstream branches to other PE routers may receive multiple EROs for the multiple downstream branches from an upstream PE router. The PE router that receives the multiple EROS, each having the same session object, may reuse the same MPLS label for each of the RSVP-TE Resv messages responsive to the EROS, for the multiple downstream branches belong to the same P2MP LSP. In addition, the PE router installs forwarding information that causes the PE router, upon receiving a multicast packet for the P2MP LSP, to create a copy of the multicast packet for each of the downstream branches, swap in the appropriate respective MPLS label for each of the branches, and forward each of the labeled copies of the multicast packet via an appropriate interface to a downstream PE router.

The architecture of PE router 30 illustrated in FIG. 5 is shown for exemplary purposes only. The invention is not limited to this architecture. In other embodiments, PE router 30 may be configured in a variety of ways. In one embodiment, for example, some of the functionally of control unit 31 may be distributed within IFCs 32. In one embodiment, control unit 31 may include a routing engine that performs routing functions and maintains routing information base (RIB), e.g., routing information 46.

Control unit 31 may be implemented solely in software, or hardware, or may be implemented as a combination of software, hardware, or firmware. For example, control unit 31 may include one or more processors which execute software instructions. In that case, the various software modules of control unit 31 may comprise executable instructions stored on a computer-readable medium, e.g., a computer-readable storage medium, such as computer memory or hard disk.

Figure 6:
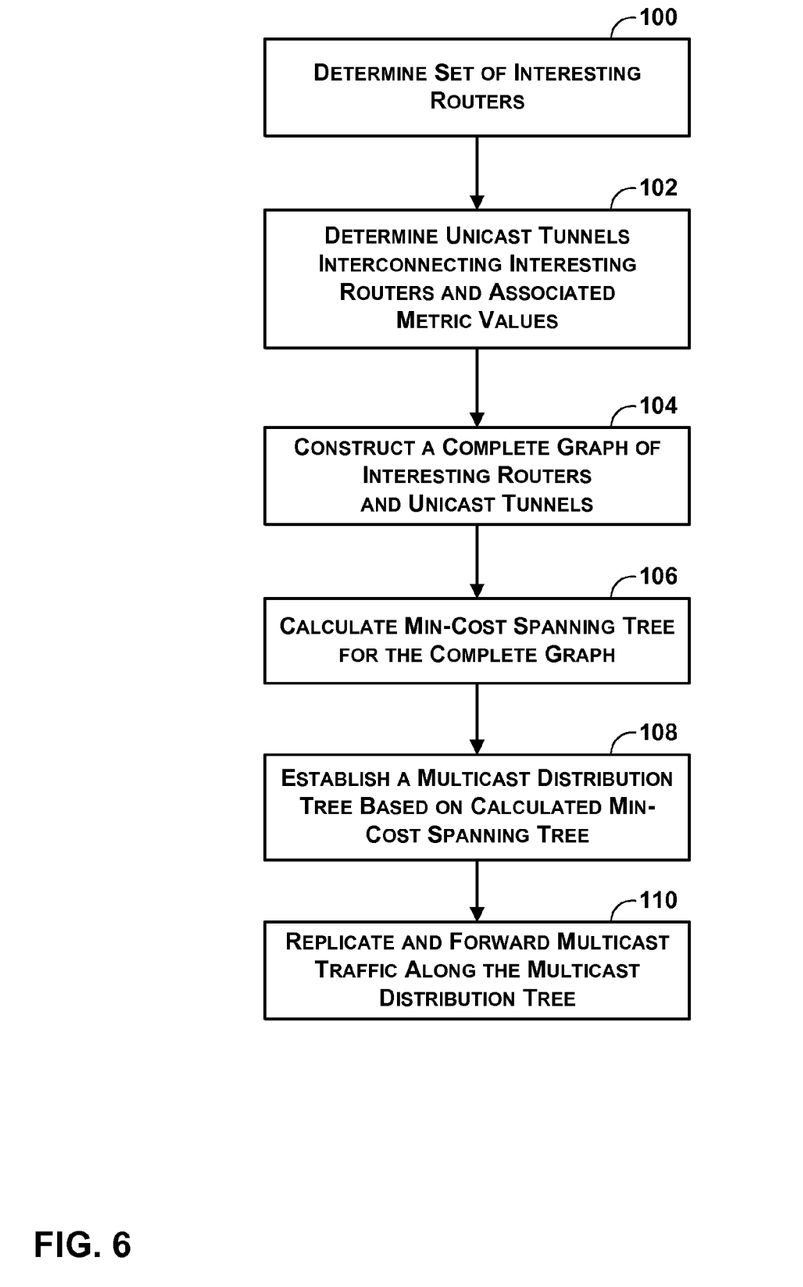
FIG. 6 is a flowchart illustrating exemplary steps for establishing a multicast distribution tree according to the techniques of this disclosure.

FIG. 6 is a flowchart illustrating an exemplary mode of operation for PE router 30 for establishing a multicast distribution tree for certain multicast traffic according to the techniques of this disclosure.

Initially, auto-discovery module 48 determines the interesting PE routers of a network for the multicast traffic (100). The determination of a PE router as interesting is dependent upon the particular application for the multicast traffic, whether, for example, VPLS, traditional IP multicast, or another application required to carry multicast traffic. As described above, auto-discovery module 48 may determine the interesting PE routers by using BGP to determine members of a VPN. In some examples, an administrator manually sets interesting PE routers via user interface 44. Mesh generator 51 queries routing information 46 and/or forwarding information 47 to obtain metric values for unicast paths (e.g., LSP tunnels) that interconnect the interesting PE routers (102). Mesh generator 51 may compute aggregate metric values for the unicast paths based on properties of individual links of the path obtained from routing information 46 and forwarding information 47.

Mesh generator 51 constructs a complete graph (i.e., a full mesh) composed of vertices representing the interesting points and edges representing the interconnecting unicast paths (104). ST calculator 52 calculates a minimum-cost spanning tree for the complete graph constructed by mesh generator 51 using a minimum-cost spanning tree algorithm (106). For example, ST calculator 52 may use Prim's algorithm or Kruskal's algorithm to calculate the minimum-cost spanning tree. ST calculator 52 may cooperate with other PE routers to execute a distributed minimum-cost spanning tree algorithm to calculate the minimum-cost spanning tree. In some instances, an administrator manually calculates the minimum-cost spanning tree.

ST setup module 50 uses one or more of protocols 36 of PE router 30 to establish a multicast distribution tree (MDT) for the multicast traffic based on the calculated minimum-cost spanning tree (108). In one example, ST setup module 50 may use RSVP-TE Path messages to direct PE routers that correspond to non-leaf vertices of the MDT to install forwarding information. The forwarding information may cause the PE routers to replicate, if necessary, and forward multicast traffic along one or more branches of the MDT. PE router 30 may install multicast forwarding state for the MDT in routing information 46 and/or forwarding information 47 when PE router 30 is an interesting PE router. When PE router 30 is an interesting PE router, PE router 30 receives multicast traffic and replicates and forwards the traffic along the MDT according to the installed multicast forwarding state (110).

Various embodiments of the invention have been described. These and other embodiments are within the scope of the following claims.

The invention claimed is:

1. A method for establishing a multicast distribution tree in a network, the method comprising:

constructing a graph of unicast tunnels that connect a set of edge routers that will distribute multicast traffic in the network, wherein the graph comprises a plurality of vertices and a plurality of edges connecting one or more vertex pairs, wherein each one of the plurality of vertices represents a different one of the edge routers, wherein each one of the plurality of edges that connects a vertex pair represents the unicast tunnel that connects the edge routers represented by the vertex pair, and wherein each edge has a metric value for a property of the represented unicast tunnel;

calculating a minimum-cost spanning tree for the graph of unicast tunnels based on the edge metric values for the edges, wherein the minimum-cost spanning tree includes the plurality of vertices and a selected subset of the plurality of edges, wherein the minimum-cost spanning tree includes a first vertex that represents an ingress one of the set of edge routers for the multicast traffic and a second vertex that shares one of the edges with a third one of the vertices other than the first vertex representing the ingress edge router; and establishing, with a network router, the multicast distribution tree based on the calculated minimum-cost spanning tree to distribute the multicast traffic from the ingress edge router to the edge routers, wherein the establishing, with the network router, the multicast distribution tree based on the minimum-cost spanning tree comprises sending, with the network router, multicast forwarding state to one or more of the set of edge routers to cause the one or more edge routers to install the multicast forwarding state and to replicate and forward multicast traffic according to the multicast distribution tree.

2. The method of claim 1, receiving, with a second edge router represented by the second vertex, a multicast packet from the ingress edge router for the multicast traffic;

replicating, with the second edge router, the received multicast packet to form a first copy of the multicast packet and a second copy of the multicast packet;

forwarding the first copy of the multicast packet from the second edge router to a subscriber device; and forwarding the second copy of the multicast packet from the second edge router to a third edge router represented by the third vertex.

3. The method of claim 2, wherein receiving the multicast packet further comprises receiving the multicast packet in a first unicast tunnel that connects the ingress edge router and the second edge router, and decapsulating the multicast packet by removing a first unicast tunnel header, and wherein forwarding the second copy of the multicast packet further comprises encapsulating the multicast packet for forwarding in a second unicast tunnel that connects the second edge router and the third edge router.

4. The method of claim 1, wherein the network router is an edge router in the set of edge routers, and wherein the network router constructs the graph and calculates the minimum-cost spanning tree for the graph.

5. The method of claim 1, wherein constructing the graph comprises constructing a complete graph comprising the plurality of vertices and the plurality of edges to interconnect the vertices in a full mesh.

6. The method of claim 1, wherein each of the unicast tunnels is a Label Switched Path (LSP).

7. The method of claim 1, wherein the minimum-cost spanning tree is a spanning tree that comprises a selected subset of the plurality of edges, wherein the total cost of the metric values for the edges in the selected subset is less than or equal to a total cost of the metric values of edges of any other spanning tree of the graph.

8. The method of claim 1, further comprising determining the set of edge routers from among a plurality of edge routers of the network.

9. The method of claim 8, wherein each of the set of edge routers participates in a Virtual Private LAN Service (VPLS) instance, and wherein each of the set of edge routers is logically connected to every other one of the set of edge routers by a unicast tunnel.

10. The method of claim 8, wherein determining the set of edge routers comprises determining an ingress edge router of the network for the multicast traffic and one or more egress edge routers of the network for the multicast traffic.

11. The method of claim 1, wherein the multicast forwarding state is Multiprotocol Label Switching (MPLS) multicast forwarding state, and wherein sending the multicast forwarding state comprises executing a Resource Reservation Protocol with Traffic Engineering extensions (RSVP-TE) to send the multicast forwarding state to the set of edge routers using RSVP messages.

12. The method of claim 1, further comprising:

determining, for each vertex pair of the graph, the unicast tunnel that connects the pair of the set of edge routers corresponding to the vertex pair; and setting the unicast tunnel as an edge that connects the vertex pair within the graph.

13. A router comprising:

a mesh generator to determine a graph of unicast tunnels that connect a set of edge routers that will distribute multicast traffic in a network, wherein the graph comprises a plurality of vertices and a plurality of edges connecting one or more vertex pairs, wherein each one of the plurality of vertices represents a different one of the edge routers, wherein each one of the plurality of edges that connects a vertex pair represents the unicast tunnel that connects the edge routers represented by the vertex pair, and wherein each edge has a metric value for a property of the represented unicast tunnel;

a spanning tree calculator to calculate a minimum-cost spanning tree for the graph of unicast tunnels based on the edge metric values for the edges, wherein the minimum-cost spanning tree includes the plurality of vertices and a selected subset of the plurality of edges, wherein the minimum-cost spanning tree includes a first vertex that represents an ingress one of the set of edge routers for the multicast traffic and a second vertex that shares one of the edges with a third one of the vertices other than the first vertex representing the ingress edge router; and a control unit executing a spanning tree setup module to establish a multicast distribution tree based on the calculated minimum-cost spanning tree to distribute the multicast traffic from the ingress router to the edge routers, wherein the spanning tree setup module sends multicast forwarding state to one or more of the set of edges routers to cause the edge routers to replicate and forward multicast traffic according to the multicast distribution tree.

14. The router of claim 13, wherein the router is the ingress edge router.

15. The router of claim 13, wherein the mesh generator determines a complete graph comprising the plurality of vertices and the plurality of edges to interconnect the vertices in a full mesh.

16. The router of claim 13, wherein each of the unicast tunnels is a Label Switched Path (LSP).

17. The router of claim 13, wherein the spanning tree calculator calculates the minimum-cost spanning tree by selecting a subset of the plurality of edges that form a spanning tree of the graph, wherein the total cost of the metric values of the selected subset is less than or equal to a total cost of the metric values of a subset of edges of any other spanning tree of the graph.

18. The router of claim 13, further comprising an auto-discovery module to determine the set of edge routers from among a plurality of edge routers of the network.

19. The router of claim 13, wherein the multicast forwarding state is Multiprotocol Label Switching (MPLS) multicast forwarding state, and wherein the spanning tree setup module sends the multicast forwarding state to one or more of the set of edge routers using a Resource Reservation Protocol (RSVP).

20. A non-transitory computer-readable medium comprising instructions for causing a programmable processor to:

construct a graph of unicast tunnels that connect a set of edge routers that will distribute multicast traffic in a network, wherein the graph comprises a plurality of vertices and a plurality of edges connecting one or more vertex pairs, wherein each one of the plurality of vertices represents a different one of the edge routers, wherein each one of the plurality of edges that connects a vertex pair represents the unicast tunnel that connects the edge routers represented by the vertex pair, and wherein each edge has a metric value for a property of the represented unicast tunnel;

calculate a minimum-cost spanning tree for the graph of unicast tunnels based on the edge metric values for the edges, wherein the minimum-cost spanning tree includes the plurality of vertices and a selected subset of the plurality of edges, wherein the minimum-cost spanning tree includes a first vertex that represents an ingress one of the set of edge routers for the multicast traffic and a second vertex that shares one of the edges with a third one of the vertices other than the first vertex representing the ingress edge router;

establish, with a network router, a multicast distribution tree based on the calculated minimum-cost spanning tree to distribute the multicast traffic from the ingress edge router to the edge routers; and send, with the network router, multicast forwarding state to one or more of the set of edge routers to cause the one or more edge routers to install the multicast forwarding state and to replicate and forward multicast traffic according to the multicast distribution tree.

* * * * *